United States Patent
Suen (10) Patent No.: US 6,380,887 B1
(45) Date of Patent: Apr. 30, 2002

(54) METHOD OF REDUCING CLUTTER AND MUTUAL INTERFERENCE IN A COHERENT DOPPLER RADAR SYSTEM

(75) Inventor: Tain-Wen Suen, Taichung Hsien (TW)

(73) Assignee: Chung-Shan Institute of Science and Technology, Taoyuan (TW)

(*) Notice: Subject to any disclaimer, the term of this patent is extended or adjusted under 35 U.S.C. 154(b) by 0 days.

(21) Appl. No.: 09/520,417

(22) Filed: Mar. 8, 2000

(51) Int. Cl.$^7$ ............................................. G01S 13/53
(52) U.S. Cl. ........................................ 342/162; 342/159
(58) Field of Search ................................. 342/159, 160, 342/161, 162

(56) References Cited

U.S. PATENT DOCUMENTS

| | | | | |
|---|---|---|---|---|
| 3,995,271 A | * | 11/1976 | Goggins, Jr. ................. | 342/159 |
| 4,206,461 A | * | 6/1980 | Pease et al. ................. | 342/159 |
| 5,345,470 A | * | 9/1994 | Alexander ................... | 342/200 |
| 5,497,162 A | * | 3/1996 | Kaiser ........................ | 342/159 |
| 5,990,824 A | * | 11/1999 | Harrison ..................... | 342/160 |

* cited by examiner

Primary Examiner—Ian J. Lobo
(74) Attorney, Agent, or Firm—J. C. Patents (57) ABSTRACT

A method is proposed for use on a coherent Doppler radar system for the purpose of reducing the clutter and mutual interference in the coherent Doppler radar system. The echoed radar signal from the target object is converted into a Range-Doppler Domain output signal. If the Range-Doppler Domain output signal indicates the presence of mutual interference, a Crisscrossing CFAR method is selected to compute for the CFAR back-ground value; otherwise an Area CFAR method is selected. A target-detection logic circuit is then used to obtain the radar information about the target object. By the proposed method, the output signal of the target-detection logic circuit is substantially free from clutter and mutual interference, which is further converted into a radar display signal to drive a radar display unit to display the location and velocity of the target object.

27 Claims, 10 Drawing Sheets

METHOD OF REDUCING CLUTTER AND MUTUAL INTERFERENCE IN A COHERENT DOPPLER RADAR SYSTEM

BACKGROUND OF THE INVENTION

1. Field of the Invention

This invention relates to radar technology, and more particularly, to a method for use on a coherent Doppler radar system for the purpose of reducing clutter and mutual interference in the coherent Doppler radar system.

2. Description of Related Art

Mutual interference would occur in a coherent Doppler radar system if it is installed near or beside another radar system of the same type or operating substantially at the same frequency. If the amplitude of mutual interference exceeds the tolerable noise level of the radar system, it would adversely affect the radar operation.

Figure 1A:
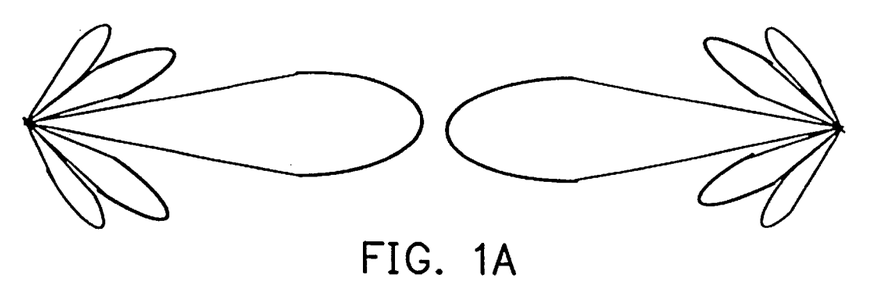
FIGS. 1A–1C are schematic diagrams used to depict three different forms of mutual interference.
Figure 1B:
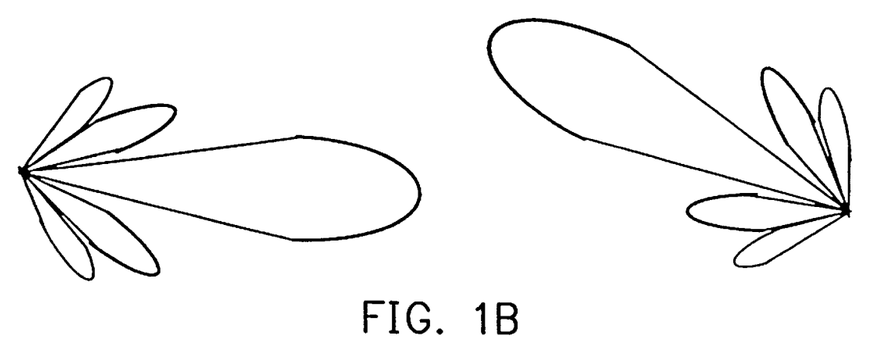
Figure 1C:
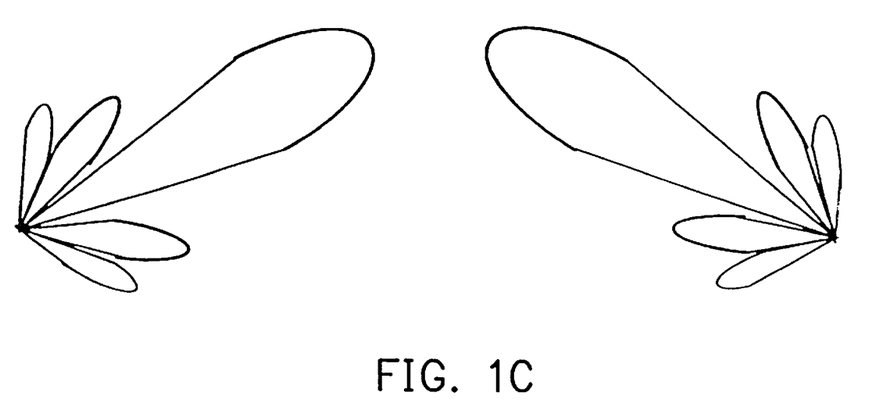

FIGS. 1A–1C are schematic diagrams used to depict three different forms of mutual interference; wherein FIG. 1A shows the case of mutual interference between two major lobes; FIG. 1B shows the case of mutual interference between major lobe and minor lobes; and FIG. 1C shows the case of mutual interference between the minor lobes of one source and the minor lobes of another source. Since major lobe possesses greater energy than minor lobes, the case of FIG. 1A would cause the greatest level of mutual interference as compared to the other two cases. When mutual interference occurs, it would affect the accuracy of range detection and target tracking by the radar system.

SUMMARY OF THE INVENTION

It is therefore an objective of this invention to provide a method for use on a coherent Doppler radar system for the purpose of reducing clutter and mutual interference in the coherent Doppler radar system.

The method of the invention is characterized in the use of a Crisscrossing CFAR (Constant False Alarm Ratio) method for computing the CFAR background value in the event of the presence of mutual interference The invention is particularly useful for eliminating mutual interference resulted from a nearby radar system operating at a close or the same frequency, allowing the detected radar data about the target object to be more accurately displayed.

The radar system utilizing the method of the invention comprises the following system parts: (a) a transmitter for generating a pulsed radar signal composed of a series of pulses spaced at a predetermined pulse repetition interval PRI; (b) an antenna for emitting the pulsed radar signal from the transmitter into the ether, and in the event of the emitted radar signal meets the target object, picking up the echoed radar signal; (c) a receiver for receiving the echoed radar signal picked up by the antenna and performing a preliminary signal processing procedure on the echoed radar signal; (d) an analog processor, coupled to the receiver, for processing the output signal of the receiver and thereby generating a video frequency signal; (e) a digital signal processor coupled to the analog processor, which is capable of digitally filtering out the clutter and mutual interference in the output video frequency signal from the analog processor to thereby generate a radar display signal; and (f) a radar display unit, which is driven by the radar display signal from the digital signal processor, for displaying the radar information about the target object.

The method of the invention comprises the following steps: (1) performing a coherent processing procedure on the echoed radar signal to thereby convert the echoed radar signal into a Range-Doppler Domain representation consisting of a number of range cells and a number of Doppler cells; (2) from the Range-Doppler Domain, determining a mutual interference detector (MID) Range Crossing value and a MID Doppler Crossing value; (3) from the MID Range Crossing value and the MID Doppler Crossing value, computing for the value of MID Range Crossing Repeat Interval and the value of MID Doppler Crossing Repeat Interval; (4) checking whether the MID Range Crossing Repeat Interval is equal to the MID Doppler Crossing Repeat Interval; (5) if YES, performing a Crisscrossing CFAR method to compute for the value of CFAR background; (6) selecting a cell under test (CUT) from the Range-Doppler Domain; (7) computing the amplitude of the selected CUT against the CFAR background; (8) specifying a minimum threshold, a CFAR background multiple, and a PRF Index; (9) computing for the threshold of the selected CUT, where the threshold of the selected CUT is equal to the multiplication of the CFAR background value of the selected CUT by the CFAR background multiple; (10) checking whether the amplitude of the selected CUT is greater than or equal to the threshold of the selected CUT and also greater than the minimum threshold; (11) if YES, indicating that the selected CUT corresponds to the target object and outputting the amplitude of the selected CUT together with the PRF Index to a radar display unit; and (12) based on the amplitude of the selected CUT and the PRF Index, displaying the location and velocity of the target object on the radar display unit.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention proposes a new method for reducing clutter and mutual interference in a coherent Doppler radar system, which utilizes a set of pulse repetition frequencies (PRF), and after these RPFs are converted into range cells, there exists a unique common factor of the numbers of these range cells. When these numbers of range cells are each divided by this common factor, the resulted quotients will be prime to each other. During operation, the radar system cyclically emits a set of pulsed radar signals, with each pulsed radar signal including a train of pulses and being emitted during each Coherent Process Interval.

Figure 2:
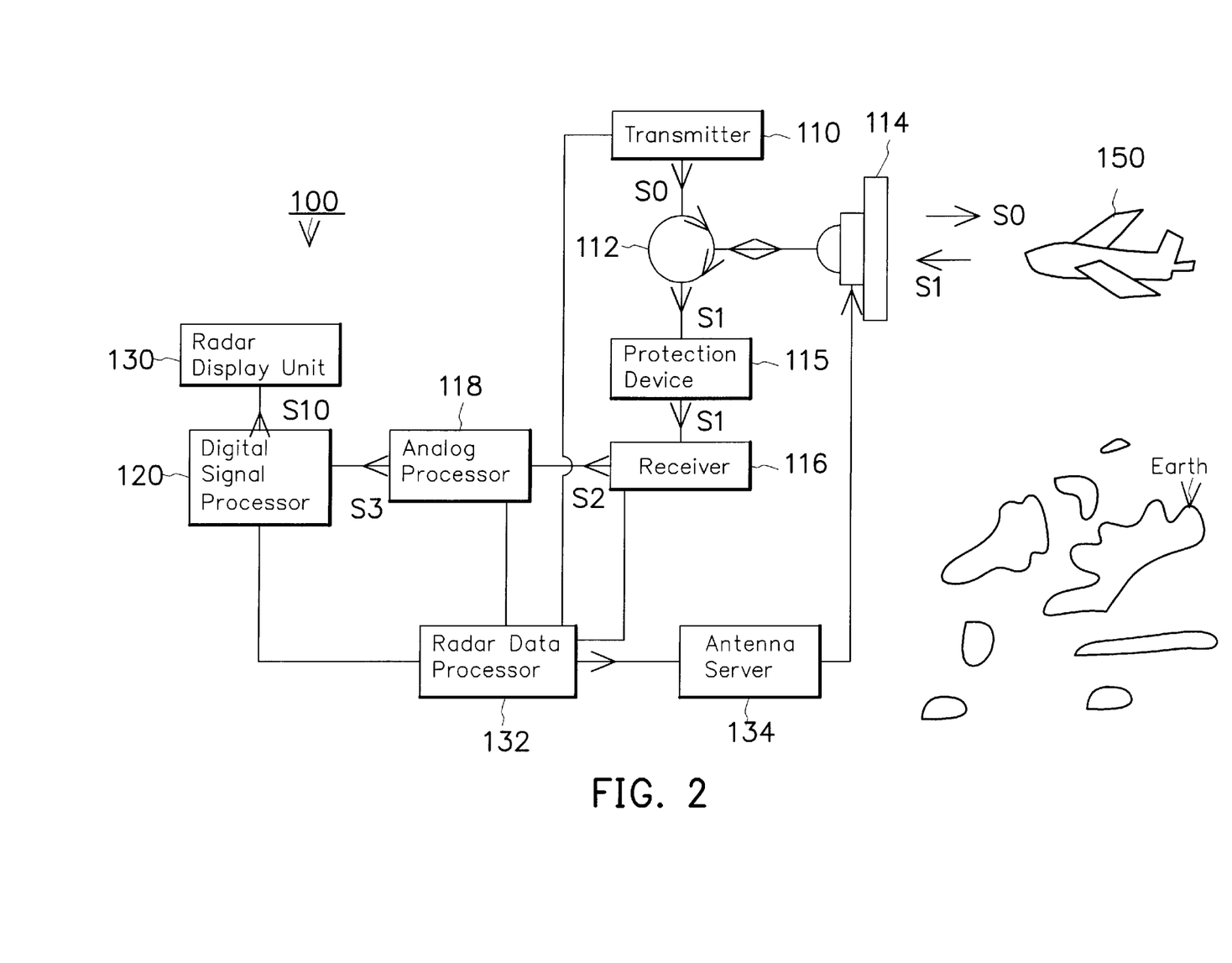
FIG. 2 is a schematic block diagram of a coherent Doppler radar system utilizing the method of the invention.

FIG. 2 is a schematic block diagram of a coherent Doppler radar system 100 which utilizes the method of the invention for reducing clutter and mutual interference. The radar system 100 is used to detect the location and velocity of a target object 150, such as an airplane. The radar system 100 includes a transmitter 110, a duplexer 112, an antenna 114, a protection device 115, a receiver 116, an analog processor 118, a digital signal processor 120, a radar display unit 130, a radar data processor 132, and an antenna server 134.

The transmitter 110 is capable of generating a pulsed radar signal S0 which is transmitted via the duplexer 112 to the antenna 114, and subsequently emitted by the antenna 114 to the ether. When the pulsed radar signal S0 strikes on the target object 150, it will be echoed back from the target object 150 and then picked up by the antenna 114. Due to earth reflections and the existence of nearby radar stations, the echoed radar signal S1 would undesirably contain clutter and mutual interference. The received echo signal S1 is transferred by the duplexer 112 and via the protection device 115 to the receiver 116 where it is down-converted to an intermediate frequency (IF) signal S2 which is then transferred to the analog processor 118.

At the analog processor 118, the IF signal S2 is digitized by sampling it at the interval defined by the Pulse Repeat Interval (PRI) of the radar system 100 to thereby obtain a video frequency signal S3 which is then transferred to the digital signal processor 120. The digital signal processor 120 is capable of reducing the undesired clutter and mutual-interference components in the video frequency signal S3 to thereby obtain a radar display signal S10 which is then used to drive the radar display unit 130 to display the detected radar information about the target object 150.

The video frequency signal S3 outputted from the analog processor 118, in addition to the detected radar information about the target object 150, contains undesired clutter and mutual interference, which, if not eliminated, would adversely affect the accuracy of range detection and target tracking of the target object 150. It is a characteristic feature of the invention that the digital signal processor 120 is capable of reducing the undesired clutter and mutual-interference components in the video frequency signal S3, as disclosed in the following.

Figure 3:
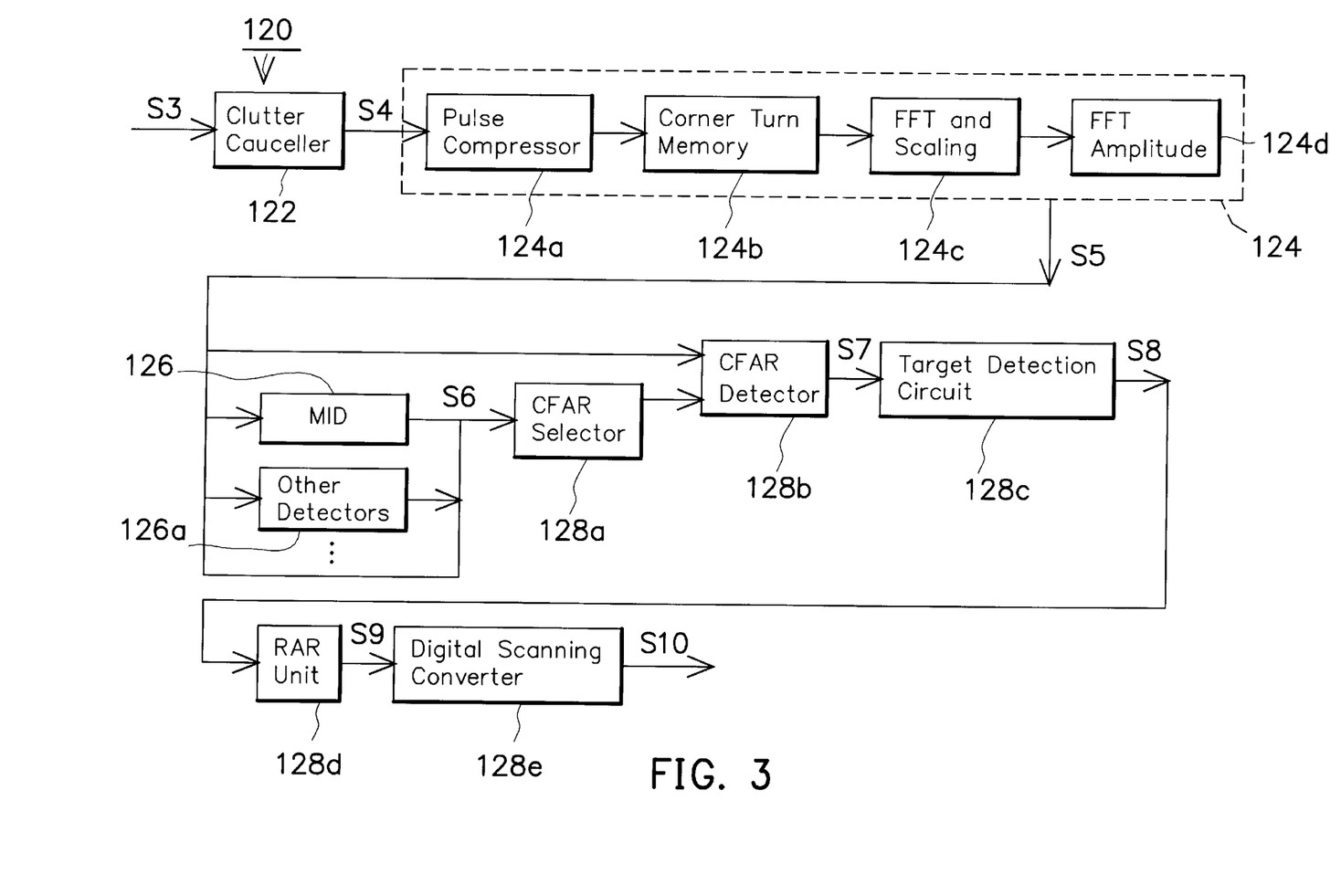
FIG. 3 is a schematic block diagram showing detailed inside architecture of the digital signal processor utilized in the radar system of FIG. 2.

FIG. 3 is a schematic block diagram showing detailed inside architecture of the digital signal processor 120. As shown, the digital signal processor 120 includes a clutter canceller 122, an integration processor 124 (which is composed of a pulse compressor 124a, a corner turn memory unit 124b, a Fast Fourier Transformation (FFT) and scaling unit 124c, and an FFT magnitude unit 124d), a mutual interference detector (MID) 126, a Constant False Alarm Ratio (CFAR) selector 128a, a CFAR detector 128b, a target detection circuit 128c, a range ambiguous resolver (RAR) 128d, and a digital scanning converter 128e.

The clutter canceller 122 receives the video frequency signal S3 as input and is capable of filtering out the clutter component in the video frequency signal S3. The output signal S4 from the clutter canceller 122 is then transferred to the integration processor 124 where it is first compressed by the pulse compressor 124a. The corner turn memory unit 124b is used to store a sequence of echoed pulses obtained during each Coherent Process Interval (CPI). These echoed pulses, which are in time domain, are then processed by the FFT and scaling unit 124c to obtain the corresponding frequency domain data. Next, the magnitude of the frequency domain data is computed by the FFT magnitude unit 124d which is capable of producing an output signal S5 indicative of the magnitude of the FFT data over the Range-Doppler Domain.

Figure 5:
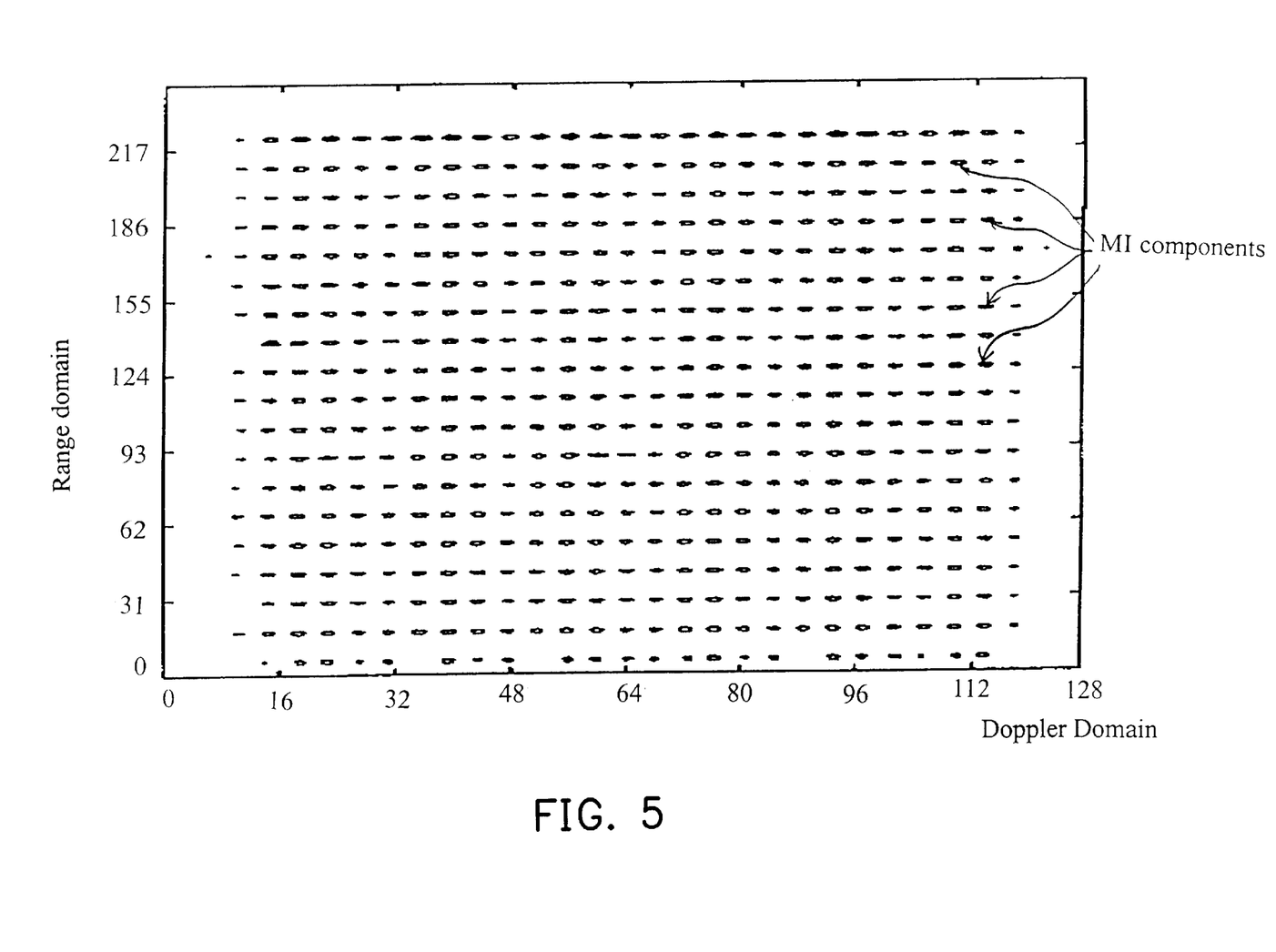
FIG. 5 is a graph, showing an example of the distribution of the FFT of a mutual-interference signal over the Range-Doppler Domain.

The radar system 100 utilizes a set of pulse repetition frequencies (PRF), and after these PRFs are converted into range cells, there exists a unique common factor of the numbers of these range cells. When these numbers of range cells are each divided by this common factor, the resulted quotients will be prime to each other. In the case that two or more radar stations are located nearby to each other, the mutual interference would result in a nail pattern in the output signal of the FFT magnitude unit 124d. Along the range domain, the nail pattern appears at a fixed interval equal to the common factor of the range cells; while along the frequency domain, it appears at a fixed interval equal to the number of filter cells, as for example illustrated in FIG. 5.

It can be seen that, through the FFT, the mutual interference component is converted into a nail pattern having nails spaced substantially at equal intervals over the Range-Doppler Domain. This allows the mutual interference component to be easily recognized and picked out for elimination.

The output signal S5 from the integration processor 124 is subsequently transferred to the MID 126, the CFAR selector 128a, and the CFAR detector 128b. The MID 126 is used to detect whether mutual interference component exists in the output signal S5 or not. If YES, it will activate the CFAR selector 128a to output a Crisscrossing CFAR select command to the CFAR detector 128b; otherwise, if NOT, it will activate the CFAR selector 128a to output an Area CFAR select command to the CFAR detector 128b. In response to the select Command from the CFAR selector 128a, the CFAR detector 128b performs either the Crisscrossing CFAR method or the Area CFAR method to compute for the CFAR background value.

Figure 4:
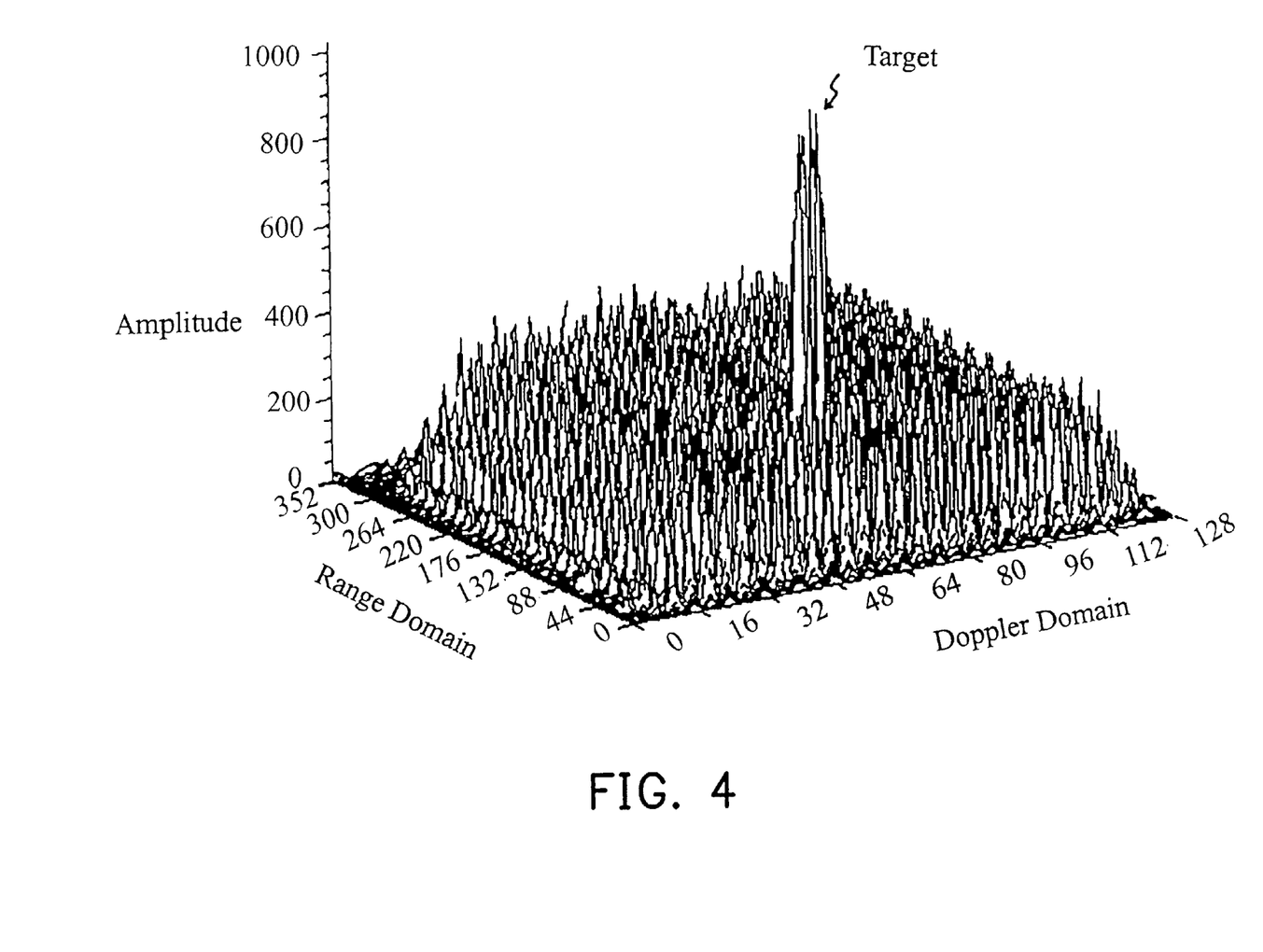
FIG. 4 is a graph, showing the nail pattern resulted from the FFT of the mutual interference.

The MID 126 can detect whether mutual interference exists in the output signal S5 by checking the FFT-produced nail pattern of the mutual interference. As illustrated in FIG. 4, the nails in the nail pattern are repeated over the Range Domain at an interval equal to the common factor of the number of range cells, and are repeated over the Frequency Domain at a fixed interval of filter cells. This repeated forms can be more distinctly seen in FIG. 5.

Figure 6:
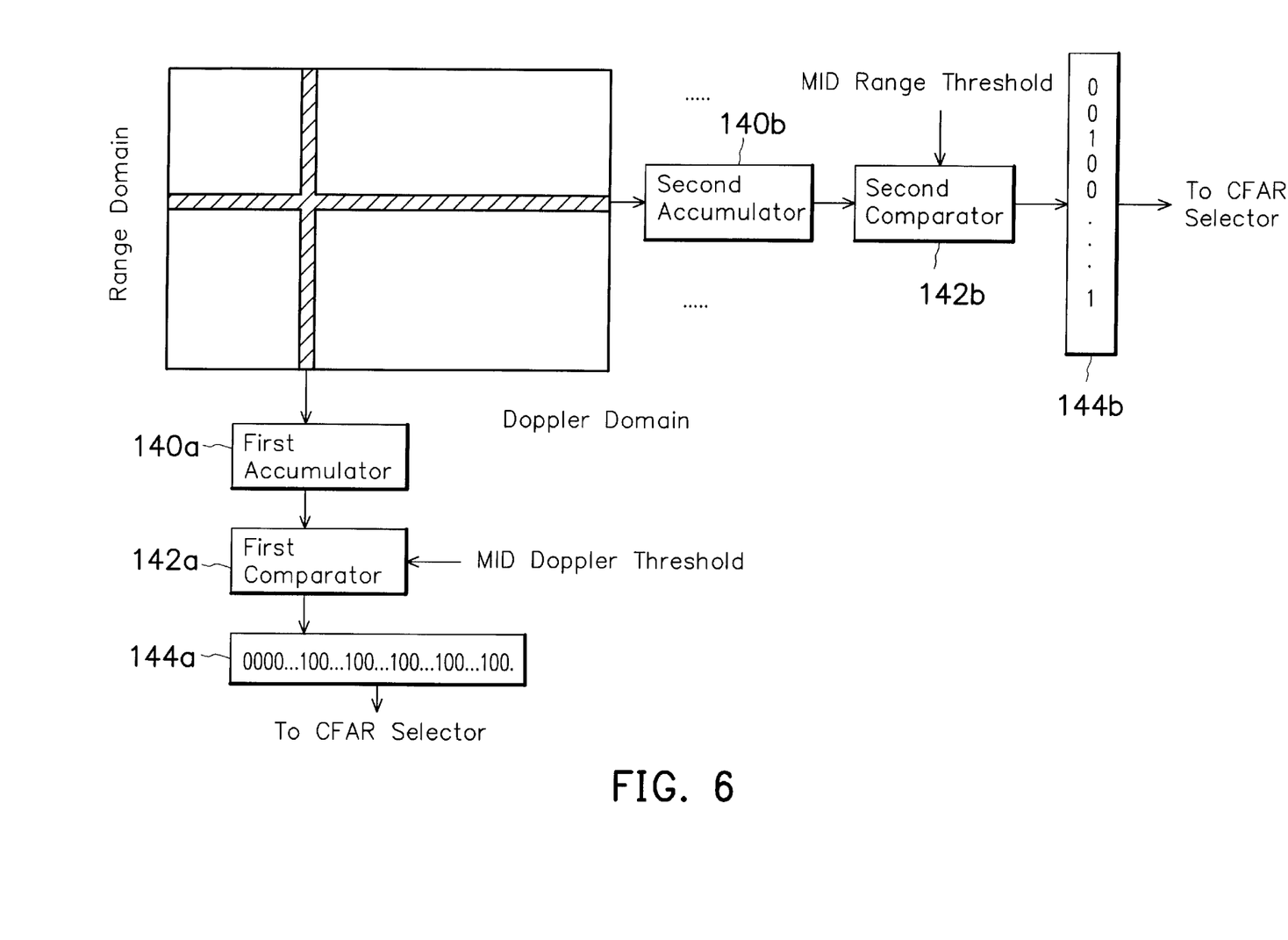
FIG. 6 is a schematic block diagram showing detailed inside architecture of the mutual-interference detector used in the digital signal processor of FIG. 3.

FIG. 6 is a schematic block diagram showing detailed inside architecture of the MID 126. As shown, the MID 126 includes a first accumulator 140a, a first comparator 142a, a first register 144a, a second accumulator 140b, a second comparator 142b, and a second register 144b. The second accumulator 140b is used to accumulate the amplitude values of all the filter cells corresponding to each range cell; and then the accumulated amplitude value is compared by the second comparator 142b against a preset MID Range Threshold. If the accumulated amplitude value is greater than the MID Range Threshold, it indicates that this range cell contains mutual interference, which is therefore declared as MID Range Crossing and is set to logic 1 status and recorded in the second register 144b. Otherwise, if less than the MID Range Threshold, this range cell is declared as Non-MID Range Crossing and is set to logic 0 status and recorded in the second register 144b. The data recorded in the second register 144b are then sent to the CFAR selector 128a for further analysis.

On the other hand, The first accumulator 140a is used to accumulate the amplitude values of all the range cells corresponding to each filter cell; and then the accumulated amplitude value is compared by the first comparator 142a against a preset MID Doppler Threshold. If the accumulated amplitude value is greater than the MID Doppler Threshold, it indicates that this filter cell contains mutual interference, which is therefore declared as MID Doppler Crossing and is set to logic 1 status and recorded in the first register 144a. Otherwise, if less than the MID Doppler Threshold, this filter cell is declared as Non-MID Doppler Crossing and is set to logic 0 status and recorded in the first register 144a. The data recorded in the second register 144b are then sent to the CFAR selector 128a for further analysis.

Figure 7:
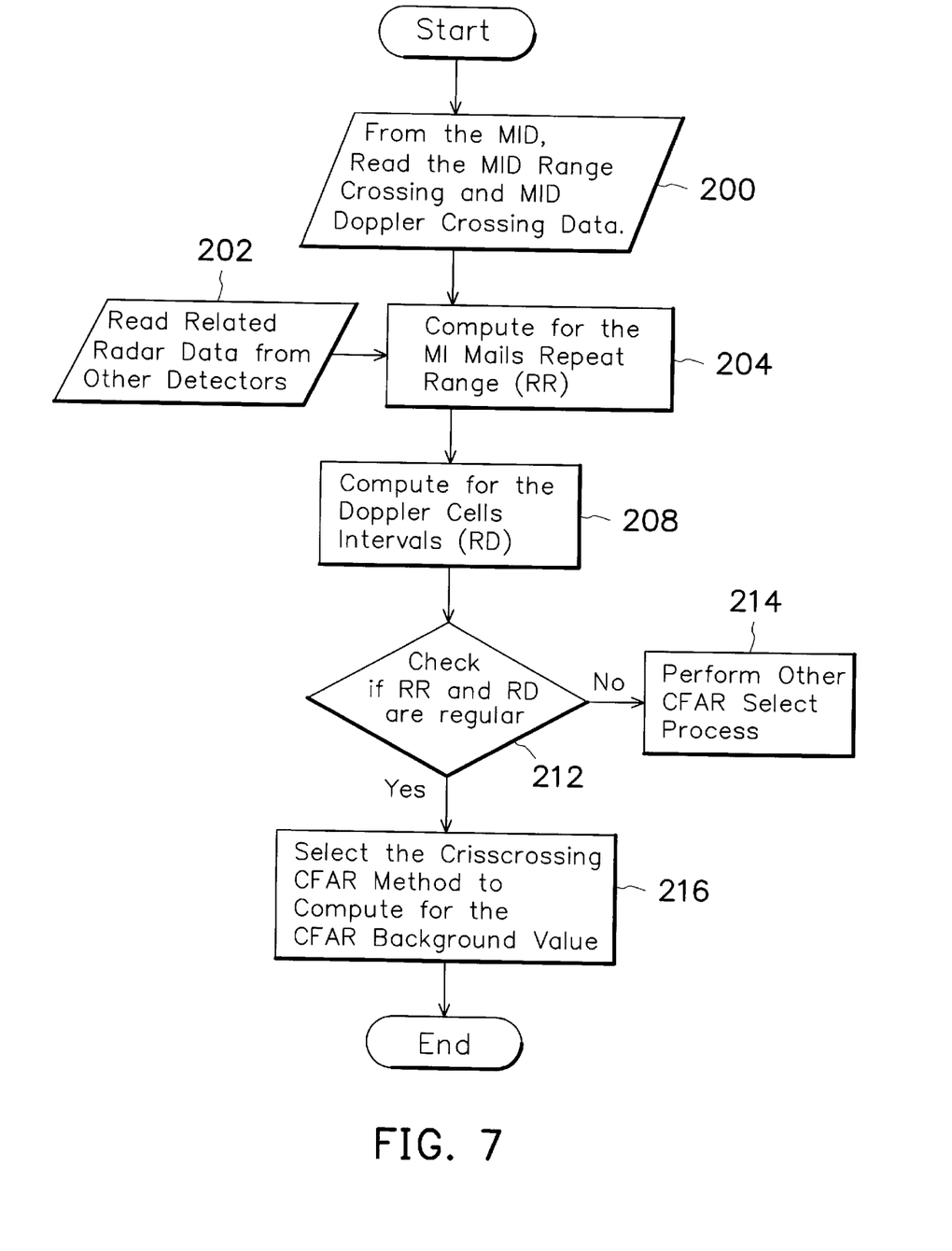
FIG. 7 is a flow diagram showing the operational steps performed by the CFAR detector used in the digital signal processor of FIG. 3.

FIG. 7 is a flow diagram showing the operational steps performed by the CFAR selector 128a shown in FIG. 3. The CFAR selector 128a takes the MID Range Crossing and MID Doppler Crossing data from the MID 126 as input parameters and computes for the MI Nails Repeat Range (denoted by RR) and Doppler Cell Intervals (denoted by RD). The CFAR selector 128a outputs the RR and RD data and transfers them together with the related CFAR command to the CFAR detector 128b. If mutual interference exists, the CFAR selector 128a outputs a Crisscrossing CFAR command to the CFAR detector 128b; otherwise, if no, the CFAR selector 128a outputs an Area CFAR command to the CFAR detector 128b.

In the first step 200, the CFAR selector 128a reads the MID Range Crossing data and the MID Doppler Crossing data from the MID 126. Concurrently in the step 202, the CFAR selector 128a also reads related data from the detectors 126a. In the steps 204 and 208, the CFAR selector 128a computes for the RR and RD values based on the received MID Range Crossing data and the MID Doppler Crossing data from the MID 126. In the step 212, the CFAR selector 128a checks whether the RR and RD values are fixed. If NO, the procedure goes to the step 214; otherwise, if YES, the procedure goes to the step 216. In the step 214, the CFAR selector 128a computes for the CFAR background value through the use of the Area CFAR method. On the other hand, in the step 216, the CFAR selector 128a computes for the CFAR background value through the use of the Crisscrossing CFAR method.

Figure 8:
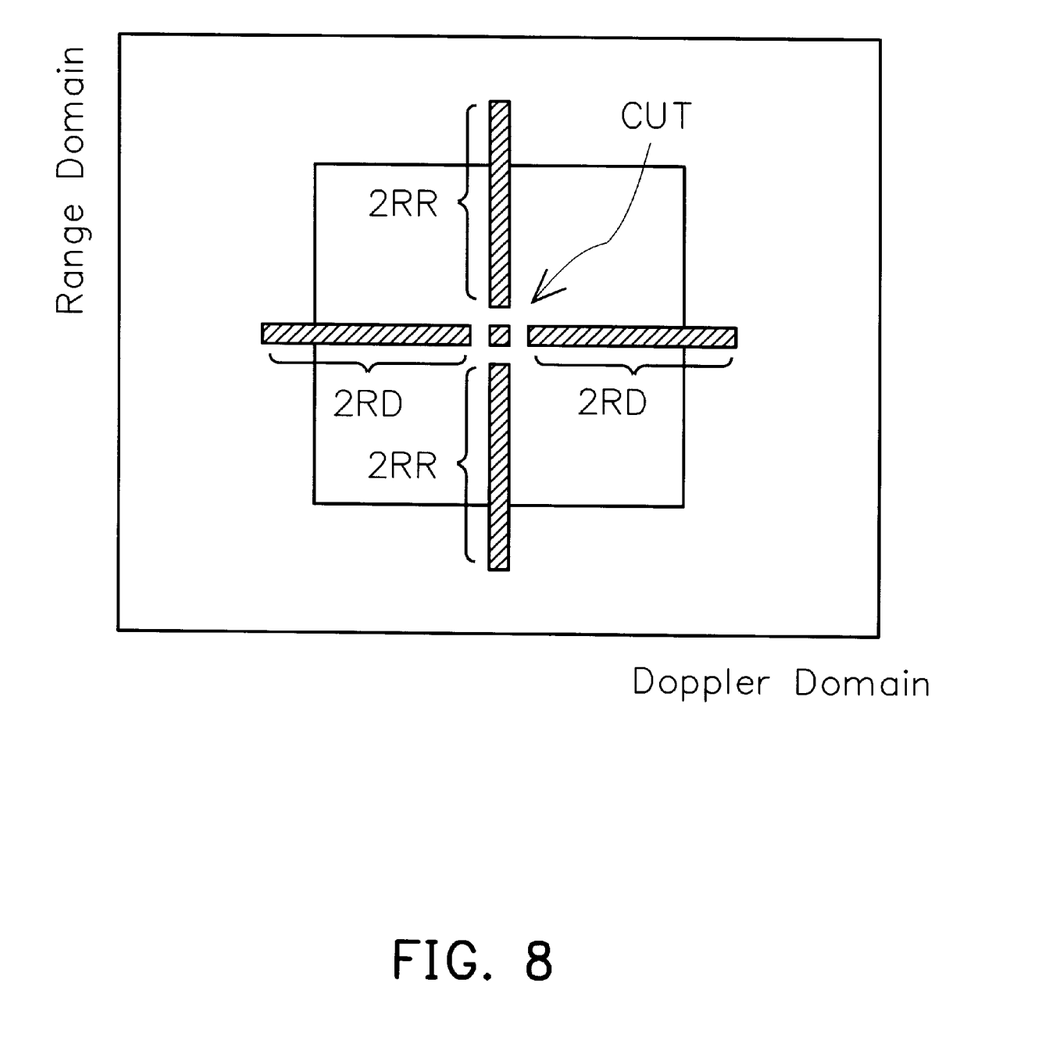
FIG. 8 is a schematic diagram used to depict the Crisscrossing CFAR method and the Area CFAR method.

FIG. 8 is a schematic diagram used to depict the Crisscrossing CFAR method and the Area CFAR method. The CFAR detector 128b is designed to compute for the background value of each cell under test (CUT). The computed background value is then transferred to the target detection circuit 128c.

The Area CFAR method is suitable for use in the case of no mutual interference; while the Crisscrossing CFAR method is suitable for use in the case of the presence of mutual interference. Based on the Crisscrossing CFAR method, the average background value of each CUT is obtained by averaging the amplitude values of those cells located to the top and bottom and those cells to the right and left of the CUT.

Figure 9:
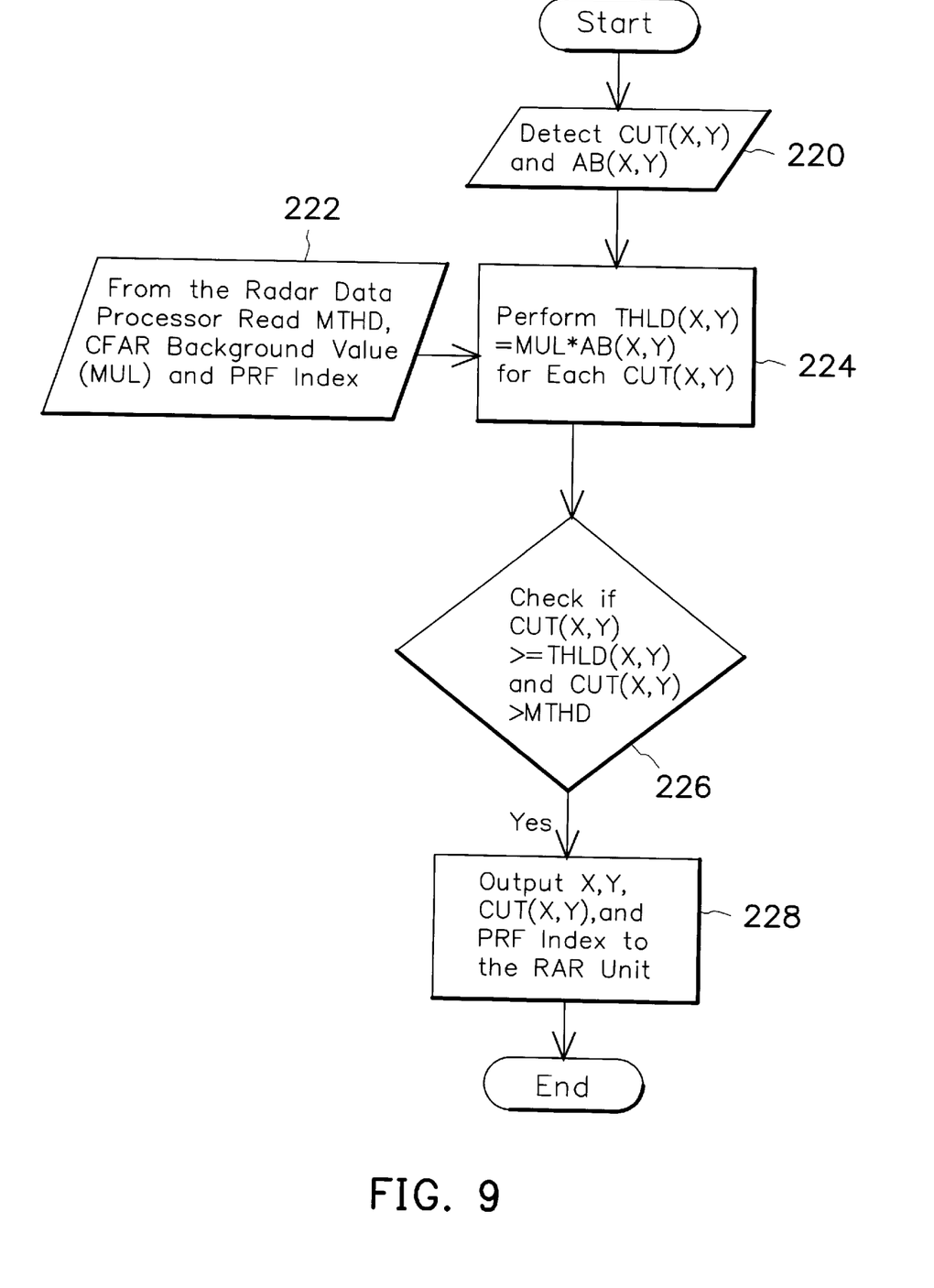
FIG. 9 is a flow diagram showing the operational steps performed by the target-detection logic circuit shown in FIG. 3.

FIG. 9 is a flow diagram showing the procedural steps performed by the target detection circuit 128c shown in FIG. 3. The target detection circuit 128c receives the output signal S7 from the CFAR detector 128b and compares it against a threshold for each CUT. If greater than the threshold, the CUT is declared as Target Crossing and set to logic 1 status; otherwise, if less than the threshold, the CUT is declared as Non-Target Crossing and set to logic 0 status. The Target Crossing data are then output as signal S8 to the RAR 128d.

As shown in FIG. 9, in the first step 220, the target detection circuit 128c reads the amplitude data of each cell under test CUT(X,Y), where X is the range cell number, and Y is the filter cell number, and the CFAR background value AB(X,Y) of CUT(X,Y). Concurrently in the step 222, the target detection circuit 128c reads from the radar data processor 132 the following pieces of data: MTHD (Minimum Threshold), MUL (CFAR Background Multiple), and PRF Index. In the step 224, the target detection circuit 128c computes for the threshold THLD(X,Y) of CUT(X,Y) based on the equation:

$$THLD(X,Y)=MUL*AB(X,Y).$$

In the next step 226, the target detection circuit 128c checks whether CUT(X,Y)≧THLD(X,Y) and CUT(X,Y) >MTHD; if YES, the procedure goes to the step 228. In the step 228 the target detection circuit 128c outputs X, Y, CUT(X,Y), and PRF Index collectively as the signal S8 to the RAR 128d. Through the RAR processing, the output signal S9 is then transferred to the digital scanning converter 128e where S9 is converted into a radar display signal S10 which is transferred to the radar display unit 130. This allows the location and velocity information about the target object 150 to be visually displayed on the radar display unit 130.

The MTHD and MUL parameters are both set to control CFAR. When mutual interference has a nail pattern distribution, it can be shown that MUL and MI amplitude are unrelated to range and related only to repetition interval, RR, and RD. Therefore, if MUL≧(RD+RR)/9, it can effectively reduce the mutual interference. The CFAR threshold THLD (X,Y) can serve two purposes. When a CUT is uninfluenced by mutual interference, THLD(X,Y) is used to control the constant false alarm rate; whereas, when influenced by mutual interference, THLD(X,Y) is used to reduce the mutual interference. To allow effective reduction of the mutual interference, the threshold is preferably set at 3 to 10 times the noise floor. For instance, the radar system can be designed in such a manner that MTHD/Noise_Floor=(RD+ RR)/9. In this case, if the threshold is equal to 3 to 10 times the noise floor, it can be obtained that 27<(RR+DD)<90.

Figure 10:
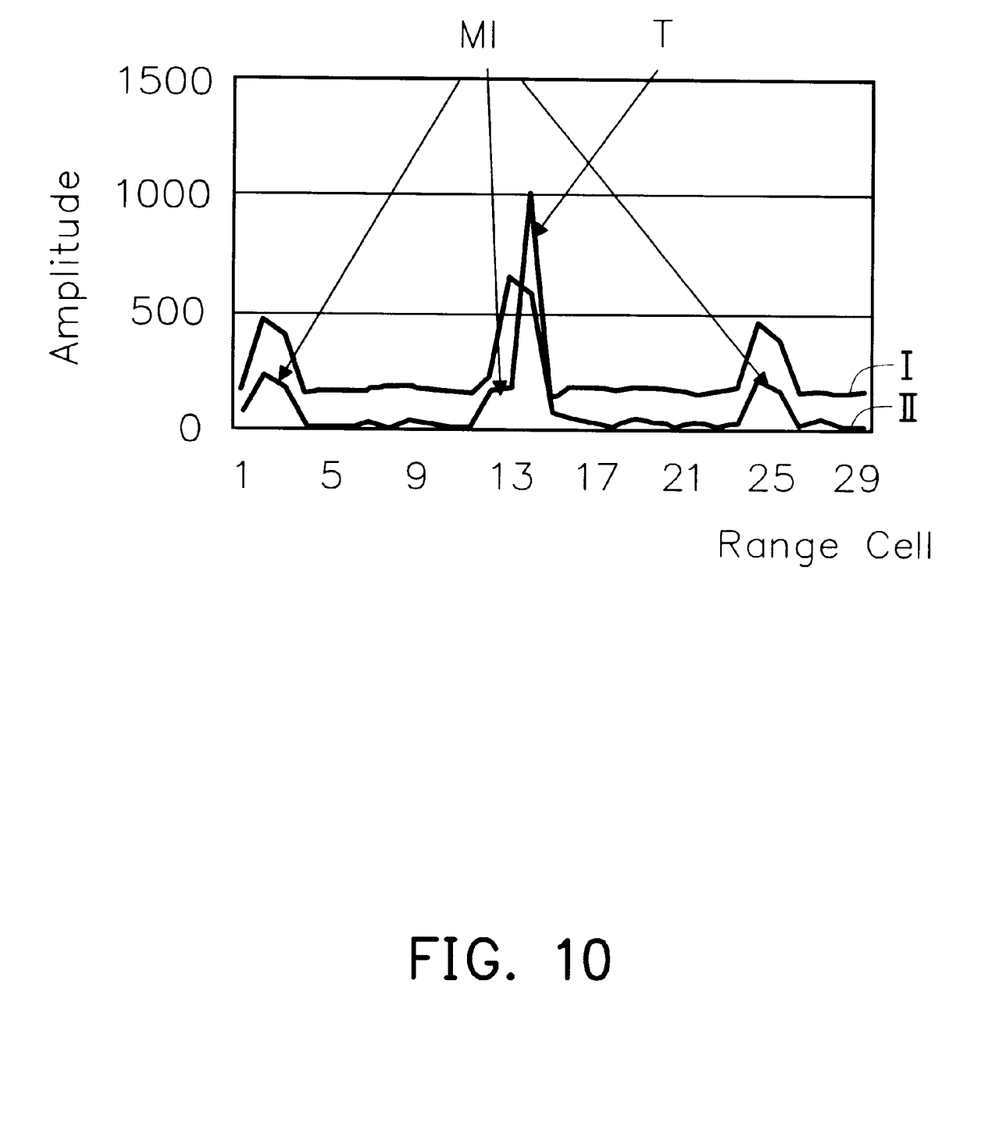
FIG. 10 is a graph showing the waveform of the output signal of the target detection circuit.

FIG. 10 is a graph showing an example of the output of the target detection circuit 128c for the range cells from number 1 to number 30. This graph shows two plots, as respectively designated by I and II. It can be learned from Plot II that the range cells 1–3, 13–15, and 25–27 are subjected to mutual interference from a nearby radar system of the same type. Moreover, it can be learned that a target object is being detected, which is indicated by the range cells 14–16 (as the part pointed by T). The Plot I shows the threshold obtained by the Crisscrossing CFAR method, whose curve would be unaffected by the mutual interference in Plot II. These two plots show that the method of the invention help the radar system to effective detect the target object while reducing the mutual interference.

In conclusion, the invention provides a method for reducing clutter and mutual interference in a coherent Doppler radar system. The invention is characterized in the use of a set of pulse repetition frequencies (PRF), and after these PRFs are converted into range cells, there exists a unique common factor of the numbers of these range cells. When these numbers of range cells are each divided by this common factor, the resulted quotients will be prime to each other.

The invention is particularly useful for eliminating mutual interference resulted from a nearby radar system operating at a close or the same frequency, allowing the location and velocity data to be more accurately obtained.

The invention is further characterized in the use of a Crisscrossing CFAR method for the computation for CFAR background value in the event of the existence of mutual interference in the echoed radar signal.

The invention is further characterized in that the CFAR background multiplier value is unrelated to the MI level, and is related to RR and RD (MI Nail Repeat Range Cell Interval and MI Nail Repeat Doppler Cell Interval). Therefore, the design for the CFAR background multiplier value can be simplied.

The radar system utilizing the invention is therefore more reliable to use since mutual interference can be substantially eliminated to allow the location and velocity data to be more accurately obtained.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A radar system for detecting a target object, which comprises:
    a transmitter for generating a pulsed radar signal composed of a series of pulses spaced at a predetermined pulse repetition interval PRI;
    an antenna for emitting the pulsed radar signal from the transmitter into the ether, and in the event of the emitted radar signal meets the target object, picking up the echoed radar signal;
    a receiver for receiving the echoed radar signal picked up by the antenna and performing a preliminary signal processing procedure on the echoed radar signal;
    an analog processor, coupled to the receiver, for processing the output signal of the receiver and thereby generating a video frequency signal;
    a digital signal processor coupled to the analog processor, which is capable of digitally filtering out the clutter and mutual interference in the output video frequency signal from the analog processor to thereby generate a radar display signal comprising:
        a clutter canceller, receiving the output signal of the analog processor, for filtering out the clutter in the output signal of the analog processor;
        an integration processor, receiving the output signal of the clutter canceller, for converting the output signal of the clutter canceller into a Range-Doppler Domain representation having a number of range cells and a number of Doppler cells;
        a Mutual Interference Detector (MID) unit, coupled to the integration processor, for detecting whether the output signal from the integration processor contains mutual interference and thereby produce an output signal indicative of the detected result;
        a Constant False Alarm Ratio (CFAR) selector, coupled to the MID unit, which is capable of selecting a suited method for the computation of CFAR background value based on the output signal of the MID;
        a CFAR detector, coupled to the integration processor and the CFAR selector, for generating an output signal indicative of the CFAR background value through the use of the method selected by the CFAR selector;
        a target-detection logic circuit, coupled to the CFAR detector, for converting the output signal of the CFAR detector into an output signal indicative of the radar information about the target object and which is substantially free of clutter and mutual interference;
        an Range Ambiguous Resolver (RAR), coupled to the target detection circuit, for performing a range ambiguous resolving process on the output signal of the target detection circuit;
        a digital scanning converter coupled to the RAR, whose output signal serving as the radar display signal; and
    a radar display unit, which is driven by the radar display signal from the digital signal processor, for displaying the radar information about the target object.

2. The radar system of claim 1, wherein the integration processor includes:
    a pulse compressor, coupled to the clutter canceller, for compressing the output signal of the clutter canceller;
    a corner turn memory unit, coupled to the pulse compressor, for storing a sequence of echoed pulses obtained during each Coherent Process Interval;
    an Fast Fourier Transformation (FFT) and scaling unit, coupled to the corner turn memory unit, for performing an FFT process on the output signal of the corner turn memory unit to obtain a Range-Doppler Domain output signal; and
    a FFT magnitude unit, coupled to the FFT and scaling unit, for determining the magnitude of the Range-Doppler Domain output signal from the FFT and scaling unit.

3. The radar system of claim 1, wherein in the event that the MID detects the presence of mutual interference, the CFAR background value is computed through the Crisscrossing CFAR method.

4. The radar system of claim 1, wherein in the event that the MID detects no mutual interference, the CFAR background value is computed through the Area CFAR method.

5. The radar system of claim 1, further comprising:
    a duplexer coupled between the transmitter and the antenna.

6. The radar system of claim 1, further comprising:
    a radar data processor, coupled to the receiver, the transmitter, and the analog processor, for processing related radar data of the radar system.

7. The radar system of claim 6, further comprising:
    an antenna server, coupled between the radar data processor and the antenna, for controlling the movement of the antenna.

8. The radar system of claim 1, further comprising:
    a plurality of detectors coupled between the integration processor and the CFAR selector.

9. The radar system of claim 1, wherein the radar information about the detected target object includes the location and velocity of the detected target object.

10. A method for use on a coherent Doppler radar system utilizing a pulsed radar signal for detecting the radar information about a target object for the purpose of reducing the mutual interference in the echoed radar signal reflected from the target object;

the method comprising the steps of:
        performing a coherent processing procedure on the echoed radar signal to thereby convert the echoed radar signal into a Range-Doppler Domain representation consisting of a number of range cells and a number of Doppler cells;

from the Range-Doppler Domain, determining a Mutual Interference Detector (MID) Range Crossing value and a MID Doppler Crossing value;

from the MID Range Crossing value and the MID Doppler Crossing value, computing the value of the MID Range Crossing Repeat Interval and the value of the MID Doppler Crossing Repeat Interval;

checking whether the MID Range Crossing Repeat Interval and the MID Doppler Crossing Repeat Interval are regular, if YES, performing a Crisscrossing Constant False Alarm Ratio (CFAR) method to compute for the value of CFAR background;

selecting a Cell Under Test (CUT) from the Range-Doppler Domain;

computing the amplitude of the selected CUT against the CFAR background;

specifying a minimum threshold, a CFAR background multiple, and a Pulse Repetition Frequencies (PRF) Index;

computing for the threshold of the selected CUT, where the threshold of the selected CUT is equal to the multiplication of the CFAR background value of the selected CUT by the CFAR background multiple;

checking whether the amplitude of the selected CUT is greater than or equal to the threshold of the selected CUT and also greater than the minimum threshold;

if YES, indicating that the selected CUT corresponds to the target object and outputting the amplitude of the selected CUT together with the PRF Index to a radar display unit; and based on the amplitude of the selected CUT and the PRF Index, displaying the location and velocity of the target object on the radar display unit.

11. The method of claim 10, wherein the pulsed radar signal is composed of a series of pulses spaced at a predetermined Pulse Repetition Interval (PRI).

12. The method of claim 10, wherein the coherent process interval in the coherent processing procedure is equal to the multiplication of PRI with Fast Fourier Transformation (FFT) size.

13. The method of claim 10, wherein the PRI of the emitted radar signal having a greatest common denominator denoted by RR (MI Nail Repeat Range).

14. The method of claim 13, wherein the Crisscrossing CFAR method, the average value of each CUT is obtained by averaging the amplitude values of 2 times of RR cells located to the top and bottom and 2 times of RD (Doppler Cell Interval) cells to the right and left of the CUT.

15. The method of claim 10, further comprising the step of:

performing a clutter-filtering process on the echoed radar signal to filter out the clutter in the echoed radar signal.

16. The method of claim 10, wherein the minimum threshold, the CFAR background multiple, and the PRF Index are supplied by a radar data processor of the radar system.

17. The method of claim 10, wherein the computation for the CFAR background value is performed by a CFAR unit.

18. The method of claim 15, further comprising the step of:

displaying the location and velocity of the target object on a radar display unit.

19. A radar system for detecting a target object, which comprises:

a transmitter for generating a pulsed radar signal composed of a series of pulses spaced at a predetermined pulse repetition interval PRI;

an antenna for emitting the pulsed radar signal from the transmitter into the ether, and in the event of the emitted radar signal meets the target object, picking up the echoed radar signal;

a receiver for receiving the echoed radar signal picked up by the antenna and performing a preliminary signal processing procedure on the echoed radar signal;

an analog processor, coupled to the receiver, for processing the output signal of the receiver and thereby generating a video frequency signal;

a digital signal processor coupled to the analog processor for removing clutter from the signal, converting the signal into a plurality of range cells, using a nail pattern in the Range-Doppler domain to remove interference, determining if a selected cell corresponds to a target object, and outputting information regarding a cell corresponding to the target object along with the pulse repetition frequency index and the location and velocity of the target object; and a radar display unit, which is driven by the radar display signal from the digital signal processor, for displaying the radar information about the target object.

20. The radar system of claim 19, wherein the digital signal processor includes:

a clutter canceller, receiving the output signal of the analog processor, for filtering out the clutter in the output signal of the analog processor;

an integration processor, receiving the output signal of the clutter canceller, for converting the output signal of the clutter canceller into a Range-Doppler Domain representation having a number of range cells and a number of Doppler cells;

a Mutual Interference Detector (MID) unit, coupled to the integration processor, for detecting whether the output signal from the integration processor contains mutual interference and thereby produce an output signal indicative of the detected result;

a Constant False Alarm Ratio (CFAR) selector, coupled to the MID unit, which is capable of selecting a suited method for the computation of CFAR background value based on the output signal of the MID;

a CFAR detector, coupled to the integration processor and the CFAR selector, for generating an output signal indicative of the CFAR background value through the use of the method selected by the CFAR selector;

a target-detection logic circuit, coupled to the CFAR detector, for converting the output signal of the CFAR detector into an output signal indicative of the radar information about the target object and which is substantially free of clutter and mutual interference;

an Range Ambiguous Resolver (RAR), coupled to the target detection circuit, for performing a range ambiguous resolving process on the output signal of the target detection circuit;

a digital scanning converter coupled to the RAR, whose output signal serving as the radar display signal.

21. The radar system of claim 20, wherein the integration processor includes:

a pulse compressor, coupled to the clutter canceller, for compressing the output signal of the clutter canceller;

a corner turn memory unit, coupled to the pulse compressor, for storing a sequence of echoed pulses obtained during each Coherent Process Interval;

an Fast Fourier Transformation (FFT) and scaling unit, coupled to the corner turn memory unit, for performing an FFT process on the output signal of the corner turn memory unit to obtain a Range-Doppler Domain output signal; and a FFT magnitude unit, coupled to the FFT and scaling unit, for determining the magnitude of the Range-Doppler Domain output signal from the FFT and scaling unit.

22. The radar system of claim 20, wherein in the event that the MID detects the presence of mutual interference, the CFAR background value is computed through the Criss-crossing CFAR method.

23. The radar system of claim 20, wherein in the event that the MID detects no mutual interference, the CFAR background value is computed through the Area CFAR method.

24. The radar system of claim 19, further comprising:

a duplexer coupled between the transmitter and the antenna.

25. The radar system of claim 19, further comprising:

a radar data processor, coupled to the receiver, the transmitter, and the analog processor, for processing related radar data of the radar system.

26. The radar system of claim 25, further comprising:

an antenna server, coupled between the radar data processor and the antenna, for controlling the movement of the antenna.

27. The radar system of claim 20, further comprising:

a plurality of detectors coupled between the integration processor and the CFAR selector.

* * * * *